United States Patent
Valade

(10) Patent No.: US 10,281,904 B2
(45) Date of Patent: May 7, 2019

(54) METHOD FOR PRINTING A PLURALITY OF VOXELS OF AN OBJECT

(71) Applicant: Océ-Technologies B.V., Venlo (NL)

(72) Inventor: Cédric T. Valade, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 109 days.

(21) Appl. No.: 15/667,439

(22) Filed: Aug. 2, 2017

(65) Prior Publication Data
US 2017/0329309 A1    Nov. 16, 2017

Related U.S. Application Data

(63) Continuation of application No. PCT/EP2016/052326, filed on Feb. 4, 2016.

(30) Foreign Application Priority Data

Feb. 9, 2015    (EP) ..................................... 15154317

(51) Int. Cl.
*B29C 64/112* (2017.01)
*B29C 64/393* (2017.01)
(Continued)

(52) U.S. Cl.
CPC ........ *G05B 19/4099* (2013.01); *B29C 64/393* (2017.08); *B33Y 10/00* (2014.12);
(Continued)

(58) Field of Classification Search
CPC ..... B29C 64/112; B29C 64/393; B33Y 10/00; B33Y 50/02; G05B 19/4099; G05B 2219/49023
See application file for complete search history.

(56) References Cited

U.S. PATENT DOCUMENTS 7,300,619 B2 * 11/2007 Napadensky ........... B29C 64/40
                                                                  264/401
7,797,069 B2 *  9/2010 Silverbrook ............ B22F 3/008
                                                                  228/180.21
(Continued)

FOREIGN PATENT DOCUMENTS

EP          2 672 692 A2    12/2013

OTHER PUBLICATIONS

International Search Report (PCT/ISA/210) issued in PCT/EP2016/052326, dated Mar. 8, 2016.
(Continued)

*Primary Examiner* — Abdelmoniem I Elamin
(74) *Attorney, Agent, or Firm* — Birch, Stewart, Kolasch & Birch, LLP

(57) ABSTRACT

The present invention relates to a method for printing a plurality of voxels of an object in a plurality of passes of a print head of a printing system over a substrate, each pass having a movement direction of the print head relative to the substrate while ejecting marking material from the print head towards the substrate, each voxel having a position in the object, the method comprising the steps of for each voxel of the object selecting a movement direction of the print head based on the position of the voxel in the object, selecting at least one pass in which the voxel will be printed, the at least one pass having a movement direction which corresponds to the selected movement direction of the print head, and printing the voxel in the selected at least one pass. The present invention also relates to a printing system configured to execute the method.

12 Claims, 10 Drawing Sheets

(51) Int. Cl.
*G05B 19/4099* (2006.01)
*B33Y 10/00* (2015.01)
*B33Y 50/02* (2015.01)

(52) U.S. Cl.
CPC ............. *B33Y 50/02* (2014.12); *B29C 64/112* (2017.08); *G05B 2219/49023* (2013.01)

(56) References Cited

U.S. PATENT DOCUMENTS

| | | | |
|---|---|---|---|
| 9,227,365 B2* | 1/2016 | Dikovsky | ............. B29C 64/386 |
| 9,339,489 B2* | 5/2016 | Jacob | ................. A61K 31/4015 |
| 9,919,474 B2* | 3/2018 | Napadensky | ........... G06T 17/00 |
| 2004/0187714 A1* | 9/2004 | Napadensky | ........... B29C 64/40 |
| | | | 101/35 |
| 2010/0191360 A1* | 7/2010 | Napadensky | ........... G06T 17/00 |
| | | | 700/98 |
| 2013/0040091 A1 | 2/2013 | Dikovsky et al. | |
| 2013/0073068 A1* | 3/2013 | Napadensky | ........... G06T 17/00 |
| | | | 700/98 |

OTHER PUBLICATIONS

Written Opinion of the International Searching Authority (PCT/ISA/237) issued in PCT/EP2016/052326, dated Mar. 8, 2016.

\* cited by examiner

METHOD FOR PRINTING A PLURALITY OF VOXELS OF AN OBJECT

CROSS REFERENCE TO RELATED APPLICATIONS

This application is a Continuation of PCT International Application No. PCT/EP2016/052326, filed on Feb. 4, 2016, which claims priority under 35 U.S.C. 119(a) to patent application Ser. No. 15/154,317.0, filed in Europe on Feb. 9, 2015, all of which are hereby expressly incorporated by reference into the present application.

FIELD OF THE PRESENT INVENTION

The present invention relates to a method for printing a plurality of voxels of an object in a plurality of passes of a print head of a printing system over a substrate, each pass having a movement direction of the print head relative to the substrate while ejecting marking material from the print head towards the substrate, each voxel having a position in the object.

The present invention further relates to a computer program product, including computer readable code embodied on a non-transitory computer readable medium, said computer readable code comprising instructions for applying the method according to the present invention and to a print system configured to apply the method according to the present invention.

BACKGROUND OF THE PRESENT INVENTION

A process for generating an object comprising a plurality of voxels is described in European patent application EP2672692 and shown in FIG. 2A-2B.

In FIG. 2A and in FIG. 2B the object 26 is printed on a substrate 21 and may have steep edges, sides and/or faces 23 approximately perpendicular to the substrate or a direction of such an edge, side or face has a substantial component in a Z direction.

In FIG. 2A a print head 22 is moving in one direction X over the substrate 21 for ejecting marking material towards the substrate 21 according to trajectories 24 in order to realize a complete layer of voxels extending over the whole upper surface of the object 26 in a mono-directional print mode.

FIG. 2B shows a bi-directional print mode wherein a print head 22 is moving in a first direction X over the substrate 21 for ejecting marking material towards the substrate 21 according to trajectories 24 in order to create a complete layer of voxels extending over the whole upper surface of the object 26 and moving in a second direction X1 over the substrate 21 for ejecting marking material towards the substrate 21 according to trajectories 25 for a next complete layer of voxels extending over the whole upper surface of the object 26.

Experiments have revealed that such steep edges, sides or faces 23 are not always very smoothly printed, and marking material of some of the trajectories 27, 28 may land on a wrong place and cause irregularities 29. The marking material is crumbled from the steep edges, sides or faces 23, also due to an air flow in the X direction or the X1 direction caused by the moving print head 22.

An object of the present invention is to provide a method for printing a plurality of voxels of an object such that the printed object has regular faces, sides, and/or edges.

SUMMARY OF THE PRESENT INVENTION

According to the present invention this object is achieved by the method according to the present invention, wherein the method comprising the steps of for each voxel of the object, selecting a movement direction of the print head based on the position of the voxel in the object, selecting at least one pass in which the voxel will be printed, the at least one pass having a movement direction which corresponds to the selected movement direction of the print head, and printing the voxel in the selected at least one pass.

A print system may have a plurality of movement direction of the print head, for example a print system having a multi-directional print mode, like a bi-directional print mode, a quarto-directional print mode etc. In a prior art print system a voxel is printed in a pass which movement direction is selected when starting the printing process and therefore predetermined for the consecutive layers of voxels which are printed in the consecutive passes. By coupling a movement direction to each individual voxel based on the position of the voxel in the object, the printing of the object is optimizible for print quality, especially for steep edges, faces and sides of the object.

According to an embodiment the method comprises the steps of for each voxel of the object slicing the voxel into a plurality of pixels, grouping pixels into groups of pixels, each group of pixels intended to be printed in one particular pass, and printing the object by printing each group of pixels consecutively in the corresponding one particular pass.

According to an embodiment of the method the step of selecting a movement direction comprises the step of for a voxel at an outer surface of the object, the outer surface not parallel to the substrate, selecting a movement direction which has a negative inner product with the normal vector of the outer surface at the position of the voxel. By doing so, the selected movement direction will be approximately in the opposite direction of the normal vector of the outer surface at the position of the voxel. Therefore the ejected marking material will not crumble from the outer surface, since the marking material is ejected towards the inner part of the object which has already been printed.

According to an embodiment of the method the step of selecting a movement direction comprises the step of for a particular voxel inside the object determining a pair of a first voxel and a second voxel at the outer surface of the object, the particular voxel, the first voxel and the second voxel having a position at the same distance perpendicular to the substrate, the first voxel intended to be printed in a pass having a first movement direction of the print head, the second voxel intended to be printed in a pass having a second movement direction of the print head opposite to the first movement direction of the print head, the particular voxel approximately lying on a line through the first voxel and the second voxel, randomly selecting a voxel on the line, for each voxel on the line piece between the first voxel and the randomly selected voxel selecting a movement direction of the print head equal to the movement direction of the print head selected for the first voxel, and for each voxel on the line piece between the second voxel and the randomly selected voxel selecting a movement direction of the print head being equal to the movement direction of the print head selected for the second voxel. By doing so, the changes of voxels having different movement directions during a pass will be randomly distributed inside the object. The outer surface may modelled having a predetermined thickness of a number of voxels. In the latter case the first and second voxel may also be selected from the inner voxels of the outer surface.

According to an embodiment of the method the step of selecting a movement direction comprises the step of for a voxel at an outer surface of the object, the outer surface parallel to the substrate, determining a pair of a first voxel and a second voxel at the outer surface of the object, the particular voxel, the first voxel and the second voxel having a position at the same distance perpendicular to the substrate, the first voxel intended to be printed in a pass having a first movement direction of the print head, the second voxel intended to be printed in a pass having a second movement direction of the print head opposite to the first movement direction of the print head, the particular voxel approximately lying on a line through the first voxel and the second voxel, randomly selecting a voxel on the line, for each voxel on the line piece between the first voxel and the randomly selected voxel selecting a movement direction of the print head equal to the movement direction of the print head selected for the first voxel, and for each voxel on the line piece between the second voxel and the randomly selected voxel selecting a movement direction of the print head being equal to the movement direction of the print head selected for the second voxel. By doing so, the changes of voxels having different movement directions during a pass will be randomly distributed at the outer surface parallel to the substrate. No irregularities will be visible at the outer surface parallel to the substrate.

According to an embodiment of the method the randomly selected voxel is randomly selected from a line piece of the line, the line piece comprising the midpoint between the first voxel and the second voxel.

According to an embodiment the absolute value of the negative inner product is larger than a predetermined limit value.

The present invention also relates to a print system comprising a print head for printing a plurality of voxels of an object in a plurality of passes of the print head over a substrate, each pass having a movement direction of the print head relative to the substrate while ejecting marking material from the print head towards the substrate, the print system comprising a print controller which is configured to execute the method according to the present invention.

According to an embodiment of the print system the print head is movable in a first movement direction and in a second movement direction, the first movement direction being opposite to the second movement direction. A bi-directional print mode, a quarto-directional print mode may be envisioned.

The present invention also relates to a computer program product, including computer readable code embodied on a computer readable medium, said computer readable code comprising instructions for executing the steps of a method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
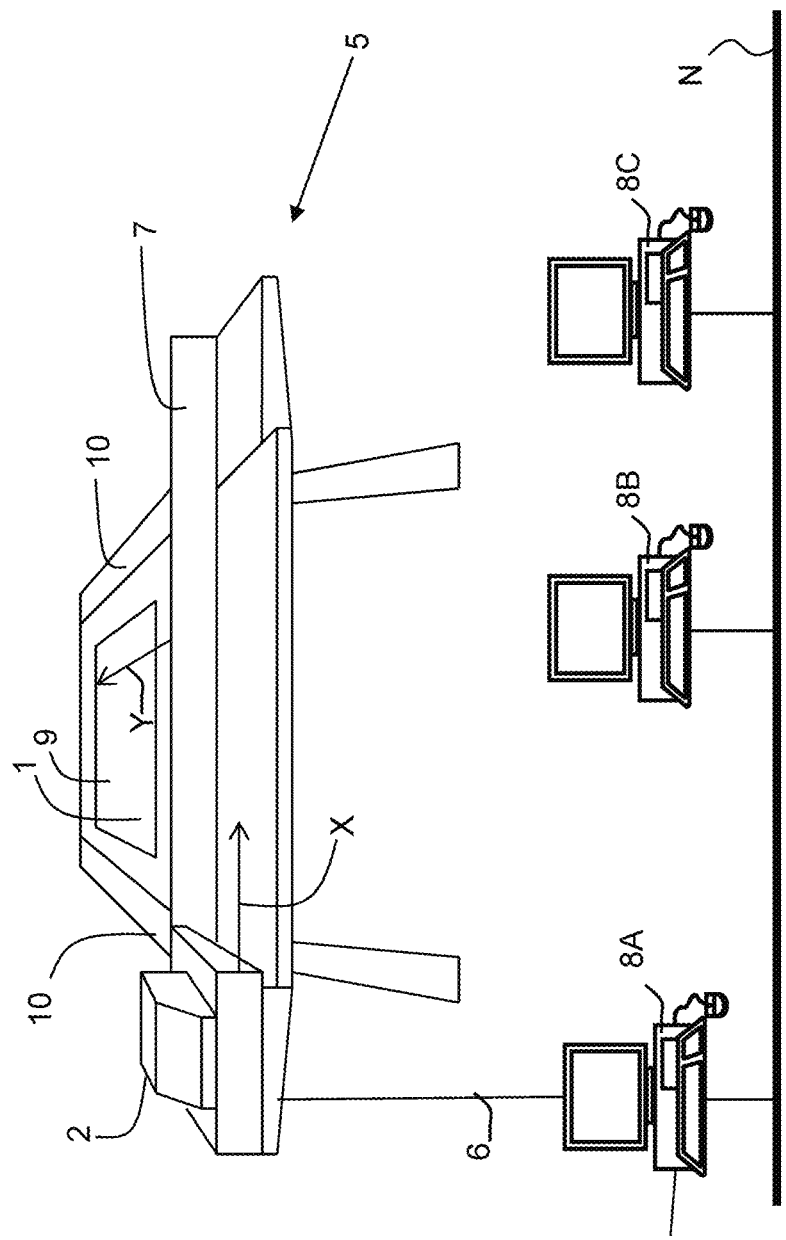
FIG. 1 is a print system in which the invented method is applicable.

FIG. 1 is a print system comprising a number of workstations 8B and 8C, which may be personal computers or other devices for preparing color image data for three dimensional objects to be printed. These workstations have access to a network N for transferring the color image data to a print controller 8A that is configured to receive print jobs for three-dimensional objects consisting of voxels and derive pass images for each pass of the print engine 2 over the flat bed 1. The print system comprises the print engine 2 for applying colorants, in this embodiment cyan (C), magenta (M), yellow (Y), black (K) and white (W) colorant, to a flat print medium 9, the substrate, in order to obtain a printed object. In this embodiment a UV-curable or hot-melt marking material is applied by print heads that reciprocally scan the substrate in a movement direction X perpendicular to a transport direction Y by means of a gantry 7. The marking material solidifies upon cooling after printing on the substrate. The present invention is applicable using UV-curable marking materials that solidify after exposure to UV-light and other types of marking material that are printed in a layer with some thickness on a substrate.

Preferentially the distance between the flat substrate and the print elements that are used to apply the various colorants, is variable. This distance may be varied in order to keep the upper surface of the object within the latitude of the print elements. The latitude of the distance between a substrate of the scanning print head is in print engine 2 about 0.5 to 2 mm.

The printer comprises a user interface (not shown), which is placed on the print engine, but which may also be part of the printer controller 8A, for selecting a print job and optionally adapt a print job parameter, such as an absolute height parameter for indicating a maximum height of the object to be printed. In an embodiment a maximum number of voxels in the height direction perpendicular to the substrate is used as height parameter. In another embodiment a user interface is provided as a network site that is accessible with a browser on a client computer.

After sending a print job comprising image data from a workstation to the printer controller, the print job will be made visible on the user interface. It may be scheduled for further processing after selection from a list of print jobs or, alternatively, if the print job is on top of the list of print jobs. The print job comprises parameter values that determine the way the image data are to be printed, such as the way how the image data are to be converted into print data.

A manner of converting image data of the object into pass images is described in European patent application EP2672692.

Figure 2A:
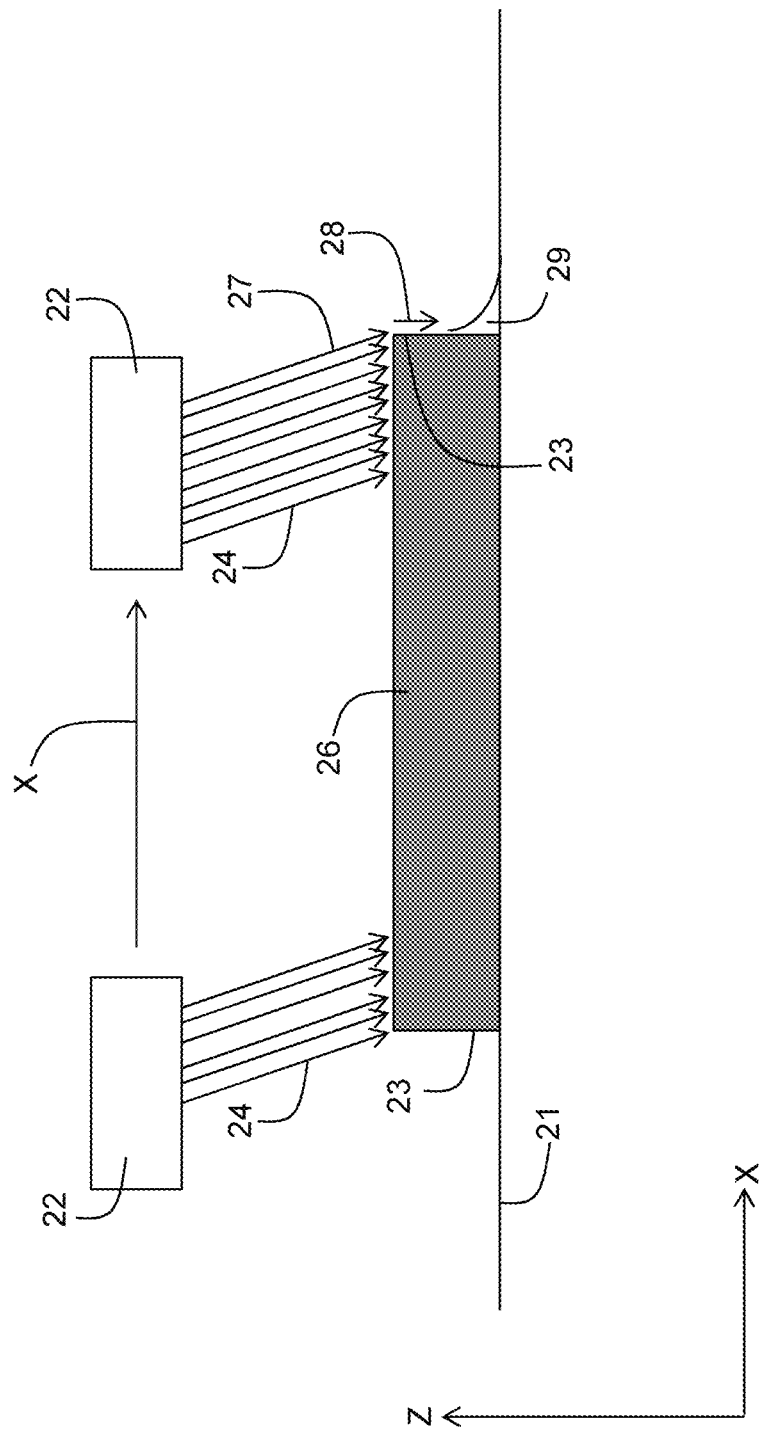
FIG. 2A-2B are schematic diagrams of a three-dimensional object to be printed according to the prior art.
Figure 2B:
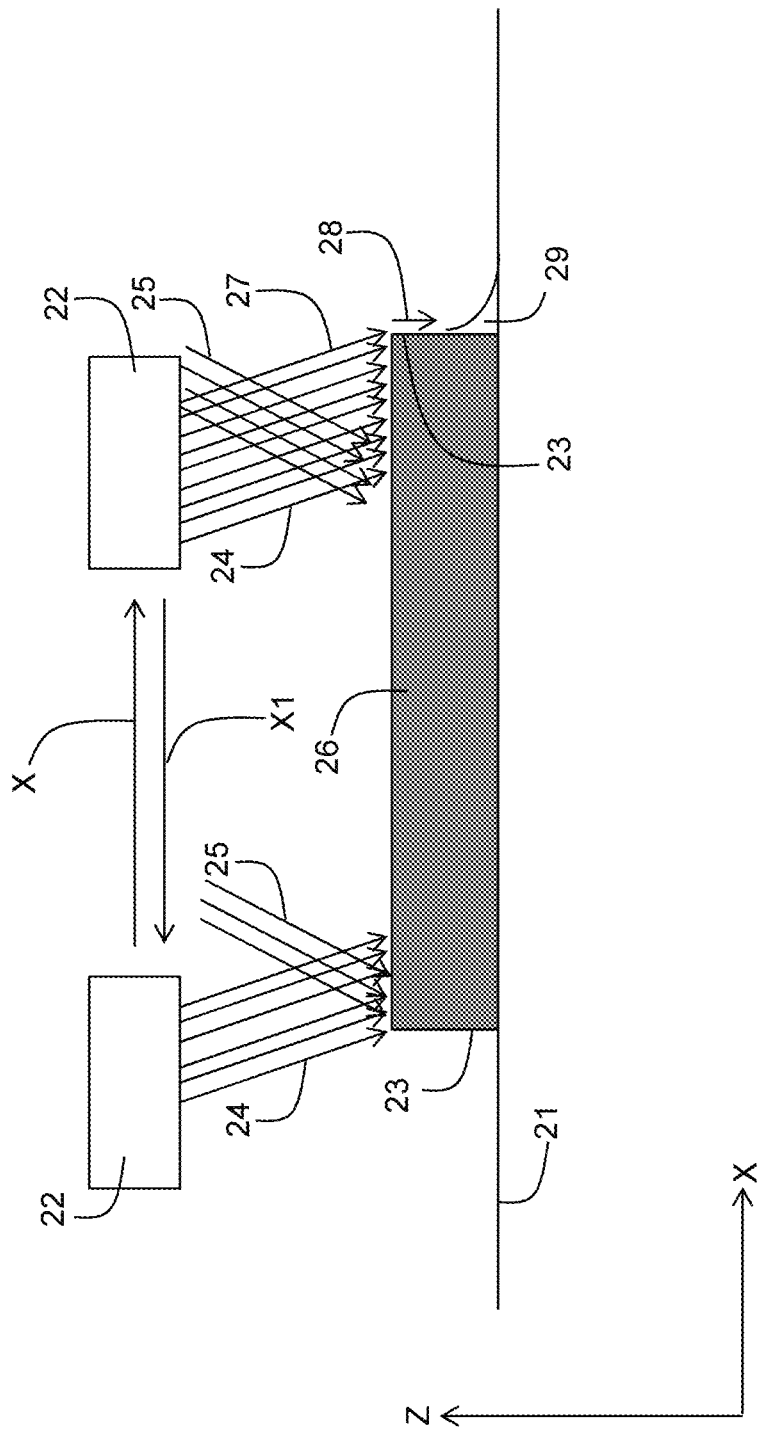
Figure 3:
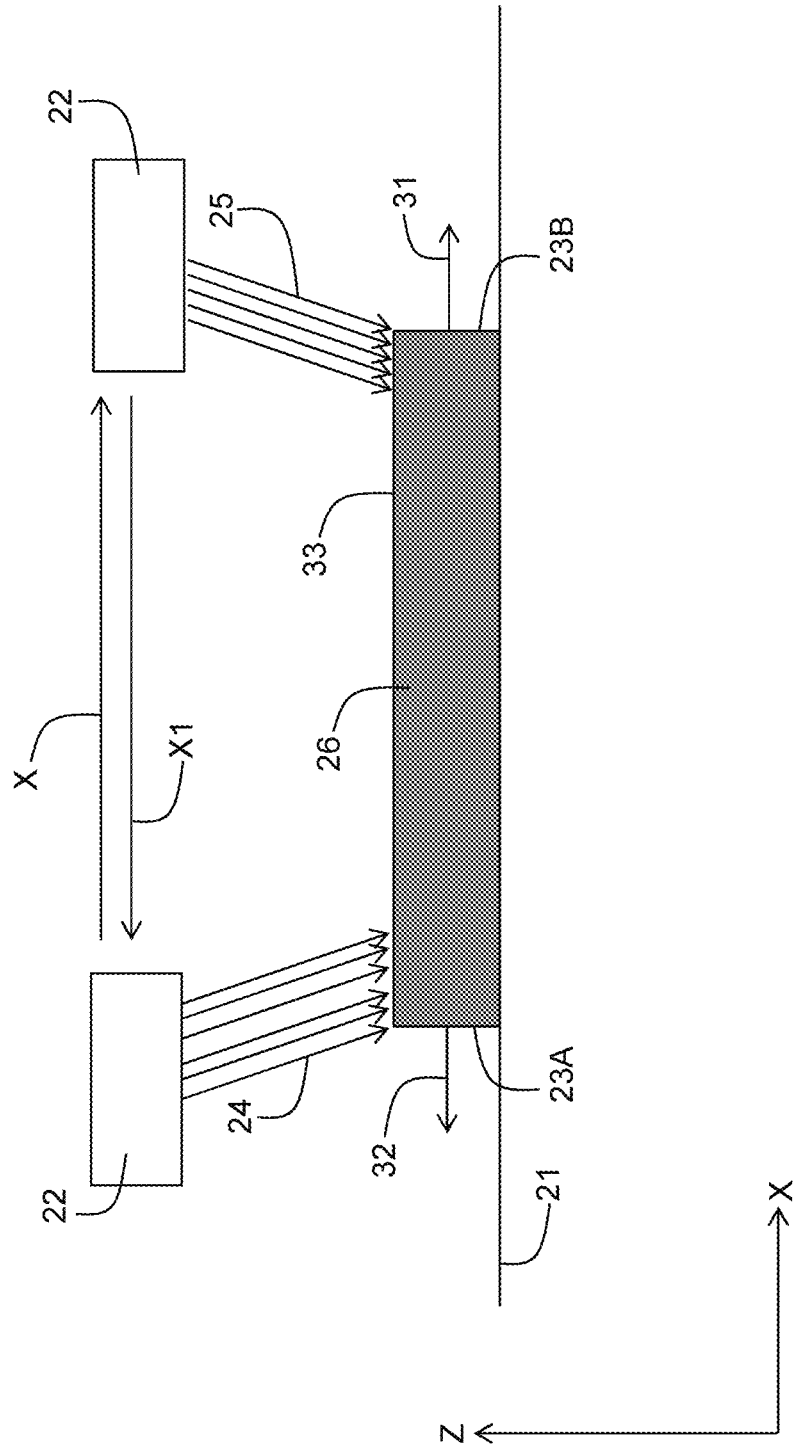
FIG. 3 is a schematic diagram of a three-dimensional object to be printed according to the method of the present invention.

FIG. 3 is a diagram showing an embodiment of the method according to the present invention being in contrast with the prior art example as shown in FIG. 2. On a substrate 21 a number of voxels of an object 26 is printed comprising a left steep edge 23A and a right steep edge 23B. The print head 22 is at least once moving in a first movement direction X and then in a second movement direction X1 opposite to the first movement direction X. A layer of voxels is added to the upper surface 33 of the nascent object 26. A voxel (not shown) near the left steep edge 23A is printed according to the trajectories 24 when the print head 22 is moving in the first movement direction X. A voxel (not shown) near the right steep edge 23B is printed according to the trajectories 25 when the print head 22 is moving in the second movement direction X1. A normal vector 32 of the first steep edge 23A is opposite to the corresponding first movement direction X. A normal vector 31 of the second steep edge 23B is opposite to the corresponding second movement direction X1.

Figure 4:
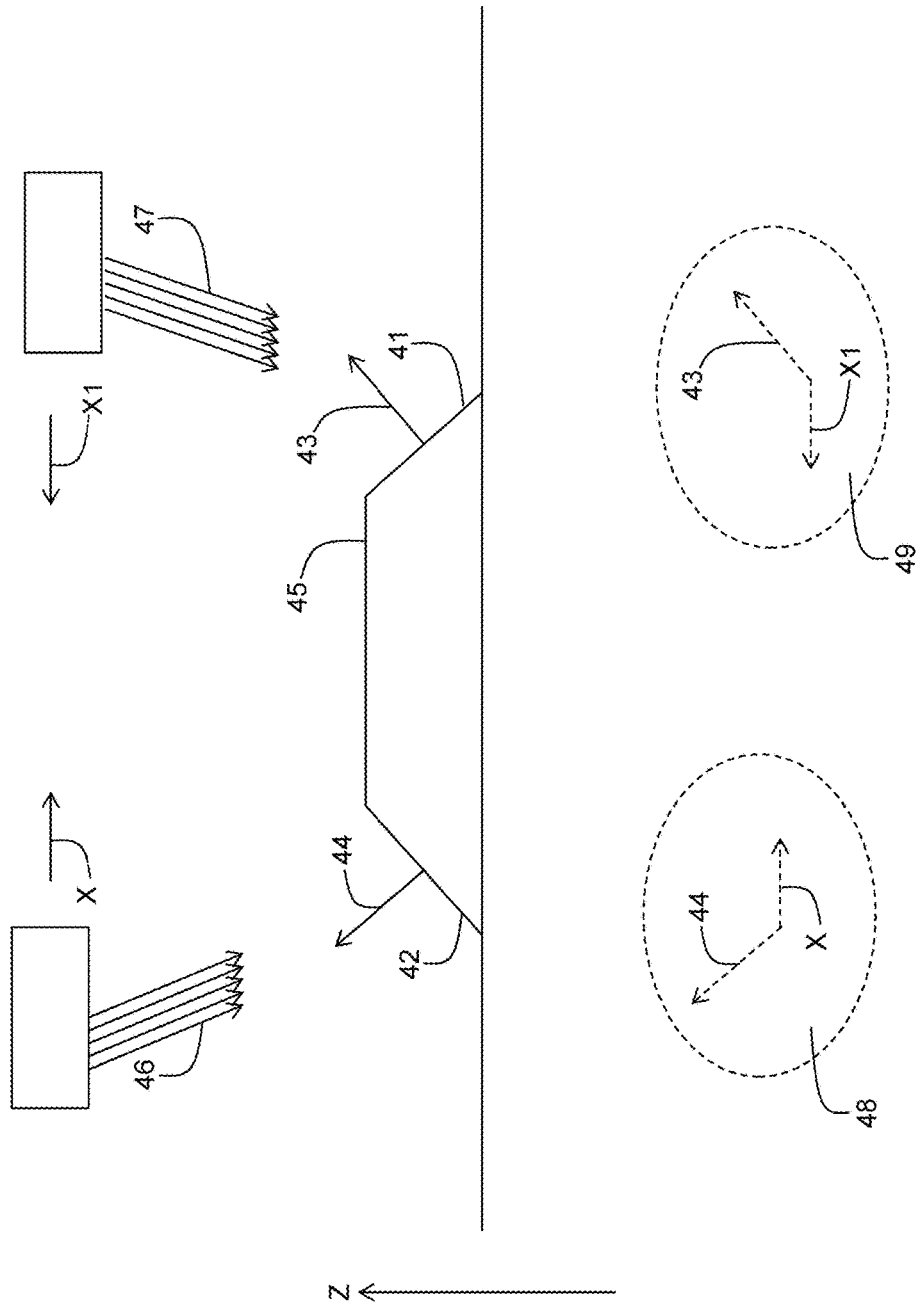
FIG. 4 is a schematic diagram of another three-dimensional object to be printed according to the method of the present invention.

FIG. 4 is a diagram showing an embodiment of the method according to the present invention being in contrast with the prior art example as shown in FIG. 2. A number of voxels of an object is printed comprising a left steep edge 42 and a right steep edge 41. The print head 22 is at least once moving in a first movement direction X and then in a second movement direction X1 opposite to the first movement direction X. A layer of voxels is added to the upper surface 45 of the nascent object. A voxel (not shown) near the left steep edge 42 is printed according to the trajectories 46 when the print head is moving in the first movement direction X. A voxel (not shown) near the right steep edge 41 is printed according to the trajectories 47 when the print head is moving in the second movement direction X1. A first normal vector 44 of the first steep edge 42 is opposite to the corresponding first movement direction X. In other words, as shown in a first fragment 48 the inner product of the first normal vector 44 and the first movement direction X is negative. A second normal vector 43 of the second steep edge 41 is opposite to the corresponding second movement direction X1. In other words, as shown in a second fragment 49 the inner product of the second normal vector 43 and the second movement direction X1 is negative.

Each voxel has a position in the object. Digital data of the object comprises each voxel of the object, its position, its color, its gloss, its material type or any other material property. From the digital data it is derived if a voxel is at the surface of the object or inside the object. From the digital data an environment of a voxel at the surface is determined and a normal vector may be determined of the surface of the object surrounding the voxel. For each voxel a movement direction of the print head is selected which movement direction has a negative inner product with the normal vector of the surface of the object at the position of the voxel.

Figure 5:
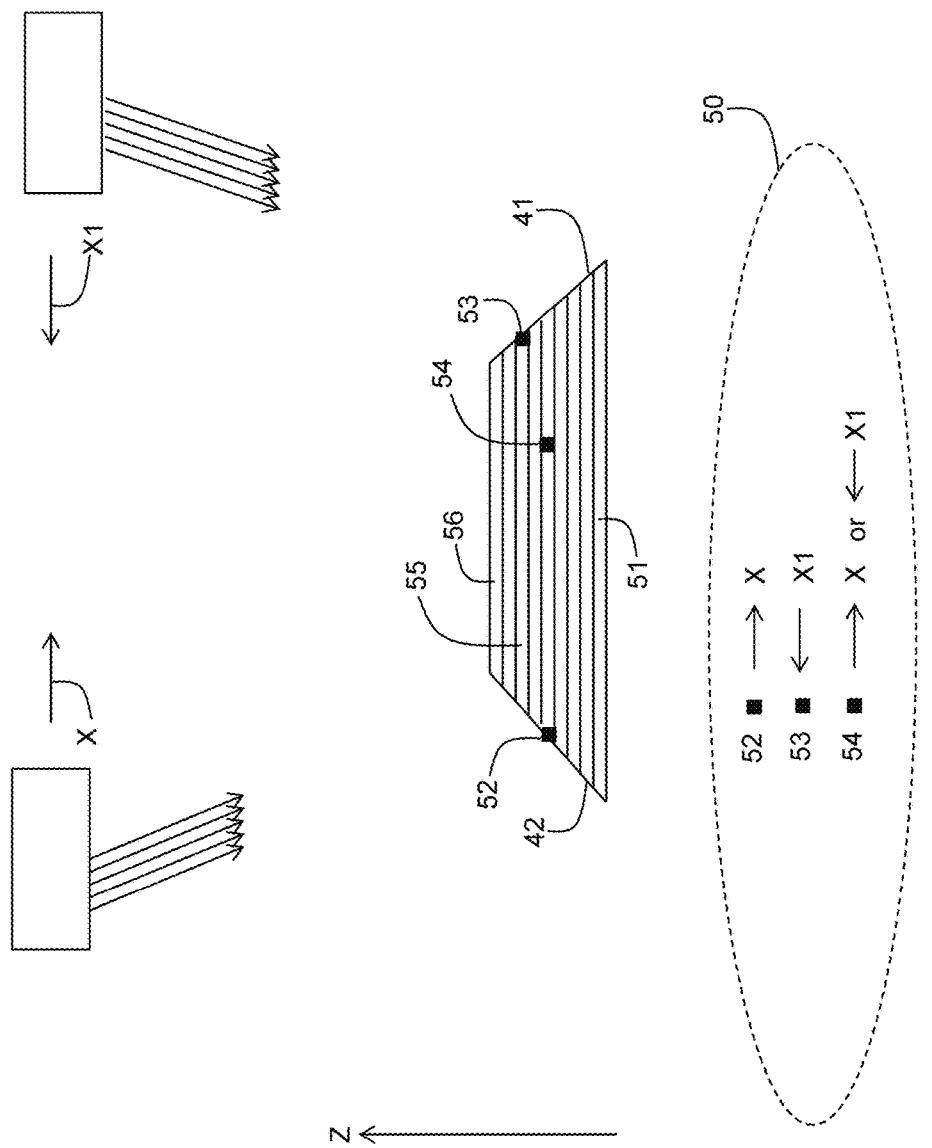
FIG. 5 is a model of the object comprising voxels to be printed according to the method of the present invention.

FIG. 5 is a diagram showing a model of the object divided into layers 51, 55, 56 of voxels. Some voxels 52, 53, 54 are shown. A first voxel 52 is an example of a voxel to be printed at the surface of the left edge 42. A second voxel 53 is an example of a voxel to be printed at the surface of the right edge 41. A third voxel 54 is an example of a voxel to be printed inside the object. As shown in fragment 50 for the first voxel 52 the first movement direction X is selected and for the second voxel 53 the second movement direction X1 is selected. For the third inner voxel 54 the first movement direction X or the second movement direction X1 has to be selected as will be explained hereinafter.

Figure 6:
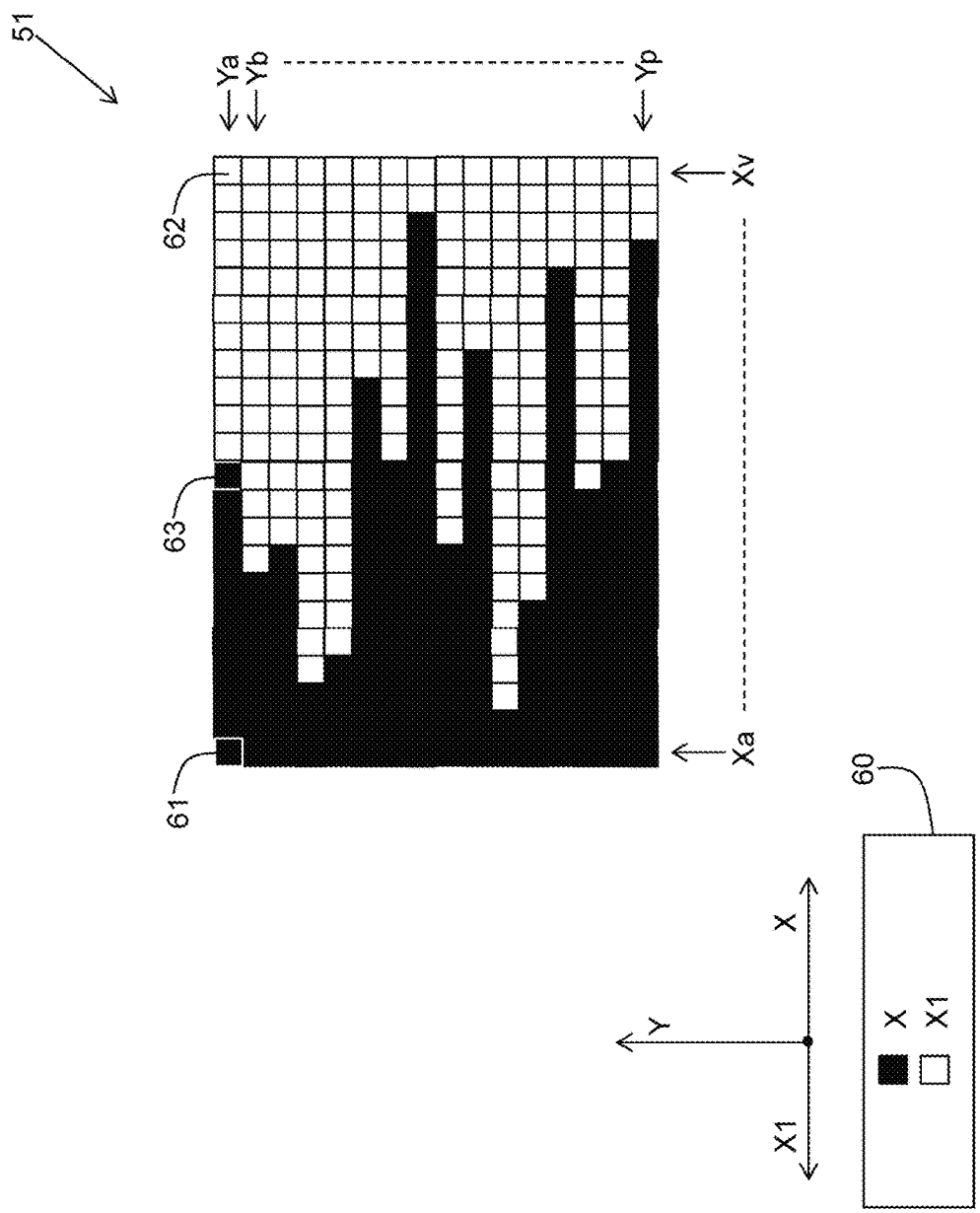
FIG. 6 displays a layer of the model of the object comprising voxels to be printed according to the method of the present invention.

FIG. 6 is a cross cut of a layer of voxels—for example layer 51 in FIG. 5—in an XY plane of the model of the object. The layer of voxels 51 comprises rows Ya-Yp of voxels corresponding to the movement directions X and X1 and columns Xa-Xv of voxels corresponding to a Y direction. For each row of voxels a randomizer of the print system selects a specific voxel in the row. For example in a first row Ya of voxels a first voxel 63 is randomly selected.

For each voxel between a voxel 61 at the left steep edge of the object and the randomly selected voxel 63 the first movement direction X is selected which movement direction corresponds to the movement direction of the voxel 61 at the left steep edge of the object. To indicate that the voxel will be printed while the print head is moving in the first movement direction X, the voxel is colored black as shown in legend 60.

For each voxel equal to the randomly selected voxel 63 or positioned between a voxel 62 at the right steep edge of the object and the randomly selected voxel 63 the second movement direction X1 is selected which movement direction corresponds to the movement direction of the voxel 62 at the right steep edge of the object. To indicate that the voxel will be printed while the print head is moving in the second movement direction X1, the voxel is colored white as shown in legend 60.

This process is done for every row Ya, Yb, . . . , Yp of the layer 51. The result is shown in FIG. 6. By doing so, the layer is divided into two parts of voxels, a connected white part of voxels to be printed in the first movement direction X and a connected black part of voxels to be printed in the second movement direction X1. By doing so, a frontier between the white part and the black part is randomized. Therefore print artefacts at a joint of the white part and the black part will be avoided.

For each layer of the model of the object this process will be repeated. By doing so, the frontiers between the black and white parts of the mutual layers 51, 55, 56 (See also FIG. 5) will also be randomized avoiding print artefacts in the Z direction. This is in particular important for the upper layer of voxels 56 to be printed at the upper—visible—surface of the object.

Figure 7:
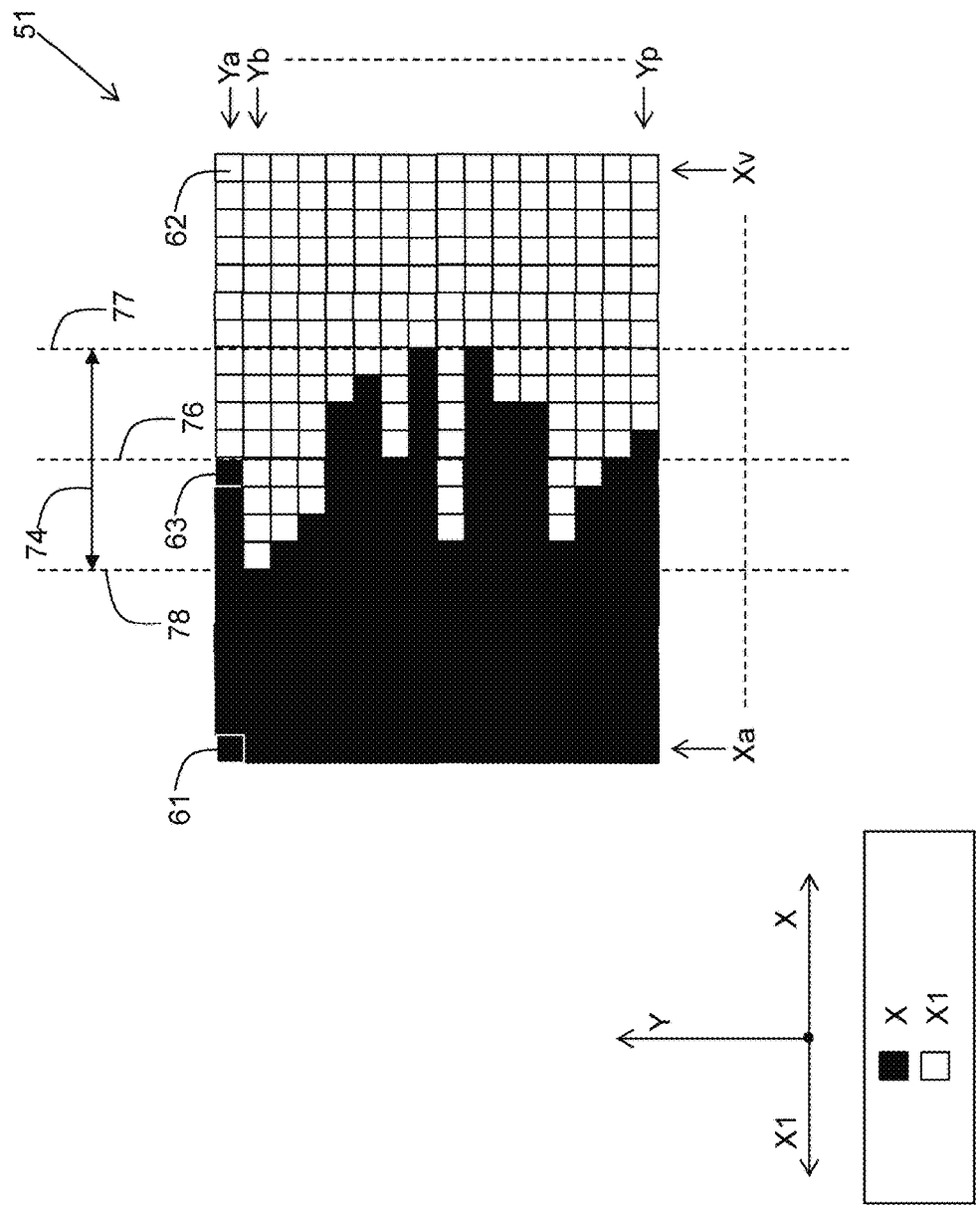
FIG. 7 displays a layer of the model of the object comprising voxels to be printed according to another embodiment of the method of the present invention.

FIG. 7 shows a further embodiment of the method according to the present invention. According to the further embodiment the randomly selected voxel 63 is randomly selected from a line piece of the row Ya. The line piece comprises a midpoint between the voxel 61 at the left steep edge and the voxel 62 at the right steep edge. The midpoint lies on the dashed line 76. The line piece has a width of 8 voxels as indicated by the double sided arrow 74. For each row Ya, Yb, . . . , Yp the randomly selected voxel is randomly selected out of voxels on the row between the dashed lines 77 and 78. The width of 8 voxels may be predetermined according to a settable print system setting. This print system setting may be set to any suitable value before printing of an object.

A distance between the voxel 61 at the left steep edge of the object and the dashed line 76 may have a predetermined minimum of voxels in order to avoid print artefacts at the surface of the left steep edge. A distance between the voxel 62 at the left steep edge of the object and the dashed line 77 may have a predetermined minimum of voxels in order to avoid print artefacts at the surface of the right steep edge. Such a predetermined minimum may be set as a settable print system setting. This print system setting may be set to any suitable value before printing of an object. Such a system setting may determine a thickness value for the surface in voxels, for example, in FIG. 7 a width of 7 voxels on the left side of the dashed line 78 or on the right side of the dashed line 77. Based on this system setting, for each pass and for each row Ya, Yb, . . . , Yp the width of a random region between the dashed lines 77 and 78 may be automatically determined based on the shape of the object.

Figure 8:
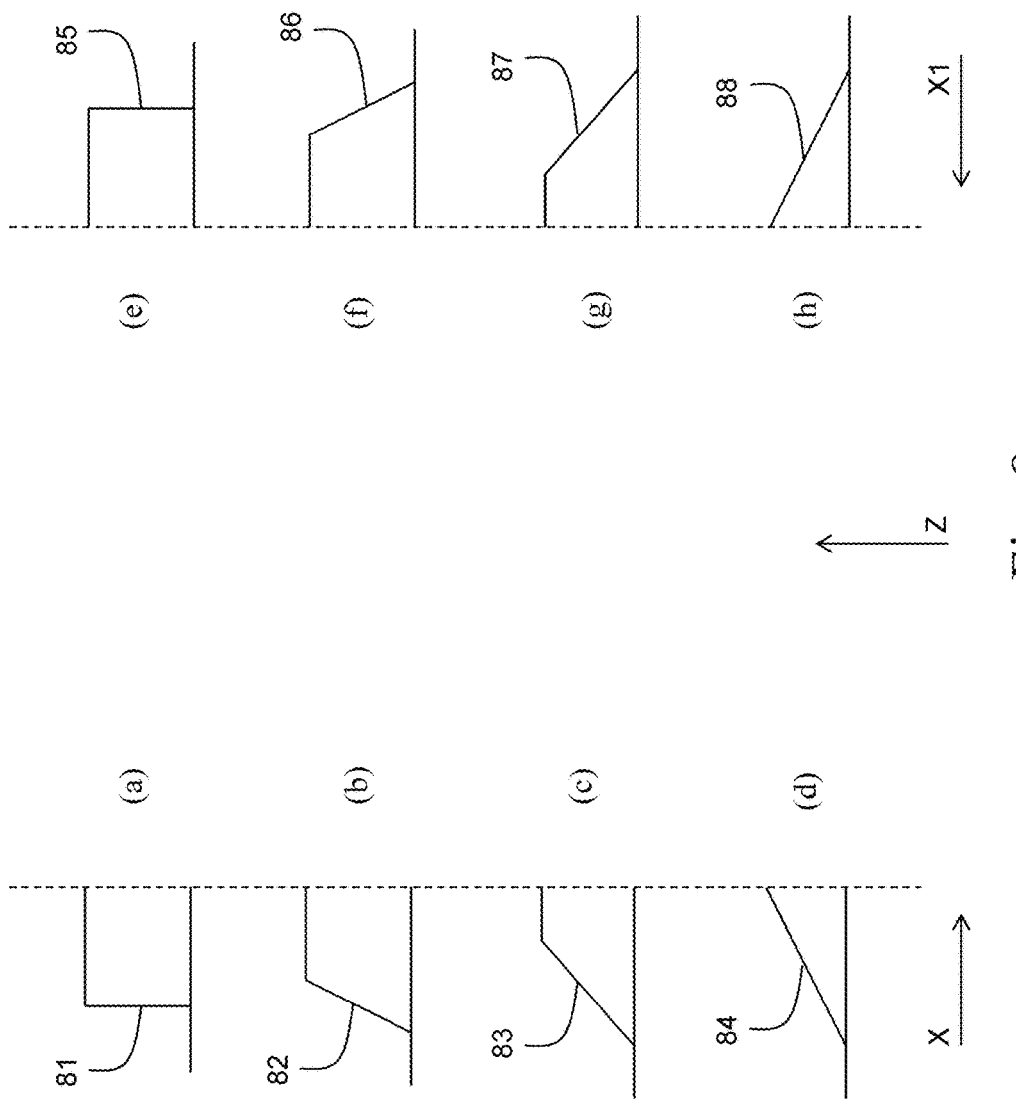
FIG. 8 shows edges of an object to be printed according to another embodiment of the method of the present invention.

FIG. 8 elucidates another embodiment of the method according to the present invention.

FIG. 8(*a*) shows a left edge 81 perpendicular to the substrate.

FIG. 8(*b*) shows a left edge 82 in an angle of ⅓ π radians to the substrate.

FIG. 8(*c*) shows a left edge 83 in an angle of ¼ π radians to the substrate.

FIG. 8(*d*) shows a left edge 84 in an angle of ⅙ π radians to the substrate.

For voxels in the left edge of FIG. 8(*a*)-8(*d*), the first movement direction X may be selected. It is clear that the urgency of selecting the first movement direction X for the voxels in a left edge decreases with the angle of the left edge to the substrate. Therefore in an embodiment the first movement direction X is selected if the absolute value of the negative inner product between the normal vector of the outer surface and the vector of the moving direction X is larger than a predetermined limit value. If the absolute value of the negative inner product is smaller or equal to the predetermined value arbitrarily the first movement direction X or the second movement direction X1 may be selected.

FIG. 8(*e*) shows a right edge 85 perpendicular to the substrate.

FIG. 8(*f*) shows a right edge 86 in an angle of ⅔ π radians to the substrate.

FIG. 8(*g*) shows a right edge 87 in an angle of ¾ π radians to the substrate.

FIG. 8(*h*) shows a right edge 88 in an angle of ⅚ π radians to the substrate.

For voxels in the right edge of FIG. 8(*e*)-8(*h*), the second movement direction X1 may be selected. It is clear that the urgency of selecting the second movement direction X1 for the voxels in a right edge decreases with the angle of the right edge to the substrate. Therefore in an embodiment the second movement direction X1 is selected if the absolute value of the negative inner product between the normal vector of the outer surface and the vector of the moving direction X1 is larger than a predetermined limit value. If the absolute value of the negative inner product is smaller or equal to the predetermined value arbitrarily the first movement direction X or the second movement direction X1 may be selected.

For convenience reasons, FIG. 3-7 shows an object to be printed which has a left edge parallel to the Y direction and a right edge parallel to the Y direction. However, the method according to the present invention is also applicable to objects which have a left edge and a right edge which are not parallel to the Y direction. For example a hemisphere may be printed according to the method of the present invention. Also an object having more than one left and right edge across the X direction may be envisioned.

In another embodiment the method is applied to printing three-dimensional objects by means of a print head which is capable of moving in more than one pair of opposite directions of a bi-directional arrow in a plane parallel to the substrate. An origin may be selected for starting points of vectors of the one or more pair of opposite directions of the bi-directional arrow. Preferably the origin may be selected inside the object to be printed, e.g. a centre of the three-dimensional object. For example a quarto-dimensional print mode may be applied with four printing directions similar to the four head compass directions North, East, South and West. For the quarto-dimensional print mode the method as described in FIG. 8(*a*)-8(*h*) may be applied as in a first bi-directional print mode and the print movement direction is switched to the second pair of opposite directions of a second bi-directional print mode based on the predetermined limit value.

Figure 9:
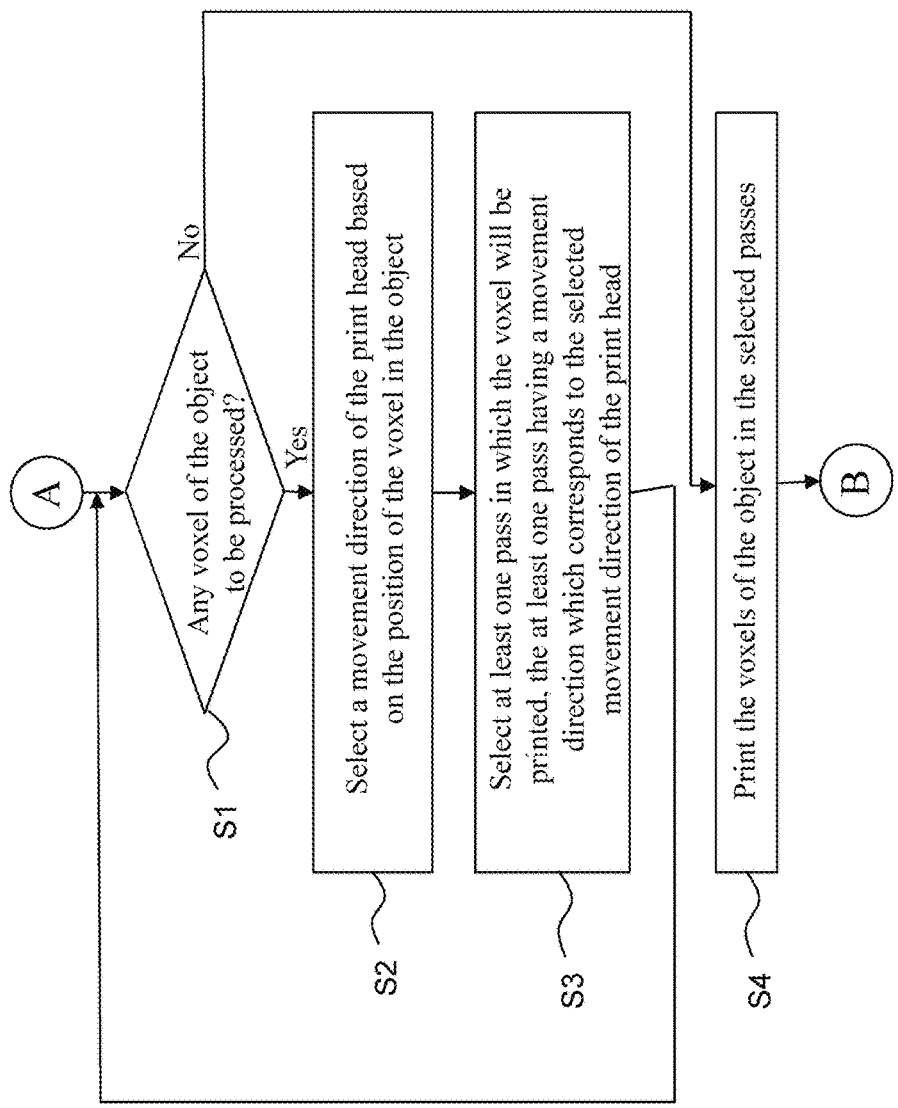
FIG. 9 is a flow diagram of an embodiment of the method according to the present invention.

FIG. 9 shows a flow diagram of an embodiment of the method according to the present invention as explained here-above. The flow diagram starts in start point A.

In a first step S1 it is checked if there is any voxel of the object left to be processed. If so, the method proceeds to a second step S2. Otherwise the method proceeds to a fourth step S4.

In the second step S2 a movement direction of the print head is selected based on the position of the voxel in the object. The voxel may be a part of the surface of the object or a part inside the object. The voxel may be part of a left edge of the object or part of a right edge of the object.

In a third step S3 at least one pass is selected in which the voxel will be printed. The at least one pass has a movement direction which corresponds to the movement direction of the print head selected in the second step S2. The method returns to the first step S1.

In a fourth step S4 the voxels of the object are printed in the passes selected in the third step S3. The method ends in end point B.

In a further embodiment of the method each voxel of the object is sliced into a plurality of pixels. The pixels are grouped into groups of pixels. Each group of pixels is intended to be printed in one particular pass. The object is printed by printing each group of pixels consecutively in the corresponding one particular pass.

The above disclosure is intended as merely exemplary, and not to limit the scope of the present invention, which is to be determined by reference to the following claims.

The invention claimed is:

1. A method for printing a plurality of voxels of an object in a plurality of passes of a print head of a printing system over a substrate, each of the plurality of passes having a movement direction of the print head relative to the substrate while ejecting marking material from the print head towards the substrate, each of the plurality of voxels having a position in the object, the method comprising the steps of, for each voxel of the object;
    selecting a movement direction of the print head based on the position of the voxel in the object;
    selecting at least one pass in which the voxel will be printed, the at least one pass having a movement direction corresponding to the selected movement direction of the print head; and
    printing the voxel in the selected at least one pass,
    wherein the step of selecting a movement direction comprises the step of for a voxel at an outer surface of the object, the outer surface not parallel to the substrate, selecting a movement direction having a negative inner product with a normal vector of the outer surface at the position of the voxel.

2. The method according to claim 1, wherein the step of selecting a movement direction comprises the steps of for a particular voxel inside the object:

determining a pair of a first voxel and a second voxel at the outer surface of the object, the particular voxel, the first voxel and the second voxel having a position at a same distance perpendicular to the substrate, the first voxel intended to be printed in a pass having a first movement direction of the print head, the second voxel intended to be printed in a pass having a second movement direction of the print head opposite to the first movement direction of the print head, the particular voxel approximately lying on a line through the first voxel and the second voxel;

randomly selecting a voxel on the line;

for each voxel on the line piece between the first voxel and the randomly selected voxel, selecting a movement direction of the print head equal to the movement direction of the print head selected for the first voxel; and for each voxel on the line piece between the second voxel and the randomly selected voxel, selecting a movement direction of the print head equal to the movement direction of the print head selected for the second voxel.

3. The method according to claim 1, wherein the step of selecting a movement direction comprises the steps of, for a voxel at an outer surface of the object, the outer surface parallel to the substrate:

determining a pair of a first voxel and a second voxel at the outer surface of the object, a particular voxel, the first voxel and the second voxel having a position at a same distance perpendicular to the substrate, the first voxel intended to be printed in a pass having a first movement direction of the print head, the second voxel intended to be printed in a pass having a second movement direction of the print head opposite to the first movement direction of the print head, the particular voxel approximately lying on a line through the first voxel and the second voxel;

randomly selecting a voxel on the line;

for each voxel on the line piece between the first voxel and the randomly selected voxel, selecting a movement direction of the print head equal to the movement direction of the print head selected for the first voxel; and for each voxel on the line piece between the second voxel and the randomly selected voxel, selecting a movement direction of the print head equal to the movement direction of the print head selected for the second voxel.

4. The method according to claim 2, wherein the randomly selected voxel is randomly selected from a line piece of the line, the line piece comprising the midpoint between the first voxel and the second voxel.

5. The method according to claim 1, wherein an absolute value of the negative inner product is larger than a predetermined limit value.

6. A print system comprising:
a print head for printing a plurality of voxels of an object in a plurality of passes of the print head over a substrate, each pass having a movement direction of the print head relative to the substrate while ejecting marking material from the print head towards the substrate; and
a print controller configured to execute the method according to claim 1.

7. The print system according to claim 6, wherein the print head is movable in a first movement direction and in a second movement direction, the first movement direction being opposite to the second movement direction.

8. A computer program product, including computer readable code embodied on a non-transitory computer readable medium, said computer readable code comprising instructions for executing the steps of the method according to claim 1.

9. A print system comprising:
a print head for printing a plurality of voxels of an object in a plurality of passes of the print head over a substrate, each pass having a movement direction of the print head relative to the substrate while ejecting marking material from the print head towards the substrate; and
a print controller configured to execute the method according to claim 2.

10. A print system comprising:
a print head for printing a plurality of voxels of an object in a plurality of passes of the print head over a substrate, each pass having a movement direction of the print head relative to the substrate while ejecting marking material from the print head towards the substrate; and
a print controller configured to execute the method according to claim 3.

11. A print system comprising:
a print head for printing a plurality of voxels of an object in a plurality of passes of the print head over a substrate, each pass having a movement direction of the print head relative to the substrate while ejecting marking material from the print head towards the substrate; and
a print controller configured to execute the method according to claim 4.

12. A print system comprising:
a print head for printing a plurality of voxels of an object in a plurality of passes of the print head over a substrate, each pass having a movement direction of the print head relative to the substrate while ejecting marking material from the print head towards the substrate; and
a print controller configured to execute the method according to claim 5.

* * * * *